(12) United States Patent
Kuo (10) Patent No.: US 7,638,050 B2
(45) Date of Patent: Dec. 29, 2009

(54) ROTATABLE WATER TREATMENT DEVICE

(75) Inventor: Yu-San Kuo, Taichung (TW)

(73) Assignee: New Century Membrane Co., Ltd., Taichung (TW)

( * ) Notice: Subject to any disclaimer, the term of this patent is extended or adjusted under 35 U.S.C. 154(b) by 430 days.

(21) Appl. No.: 11/526,760

(22) Filed: Sep. 26, 2006

(65) Prior Publication Data

US 2008/0073264 A1 Mar. 27, 2008

(51) Int. Cl.
*B01D 33/00* (2006.01)
*B01D 33/21* (2006.01)
*B01D 33/23* (2006.01)
*B01D 25/26* (2006.01)
*B01D 25/00* (2006.01)

(52) U.S. Cl. ............... 210/330; 210/326; 210/324; 210/345; 210/486; 210/488; 210/437

(58) Field of Classification Search .............. None
See application file for complete search history.

(56) References Cited

U.S. PATENT DOCUMENTS 3,157,598 A * 11/1964 Rebiscoul ............ 210/327
3,259,248 A * 7/1966 Wiegand ............ 210/487
4,221,663 A * 9/1980 Little ............ 210/193
2002/0195388 A1* 12/2002 Sierens et al. ............ 210/486
2007/0151917 A1* 7/2007 Kuo ............ 210/335
2008/0035551 A1* 2/2008 Kuo ............ 210/321.72

FOREIGN PATENT DOCUMENTS

GB 2088231 * 6/1982

* cited by examiner

*Primary Examiner*—Krishnan S Menon
*Assistant Examiner*—Benjamin Kurtz
(74) *Attorney, Agent, or Firm*—Banger Shia (57) ABSTRACT

A rotatable water treatment device including a hollow shaft and multiple filtering units is provided. The hollow shaft has an axis hole, an external wall and a plurality of through holes defined through the external wall and communicating with the axis hole. The multiple filtering units watertightly mounted on the external wall of the hollow shaft, and each of the filtering units includes a center hole, two clipping nets, a supporting net and two filtering membranes. The supporting net is mounted between the clipping nets and two filtering membranes sandwiches the clipping nets such that the filtering membranes can be prevented from sinking into the meshes of the supporting net with the pump effect to accelerate the conducting of the water-filtering.

9 Claims, 11 Drawing Sheets

ROTATABLE WATER TREATMENT DEVICE

BACKGROUND

1. Field of Invention

The present invention relates to a water treatment device, and more particularly to a rotatable water treatment device that reduces mud adherence.

2. Description of Related Art

In the conventional sewage recycle treatment, adopting the membrane filtering method is a critical procedure. But the concentration polarization and the membrane fouling of this method usually slow down the filtering liquid speed. Thus, the filtering efficiency of the membrane also decreases.

Figure 1:
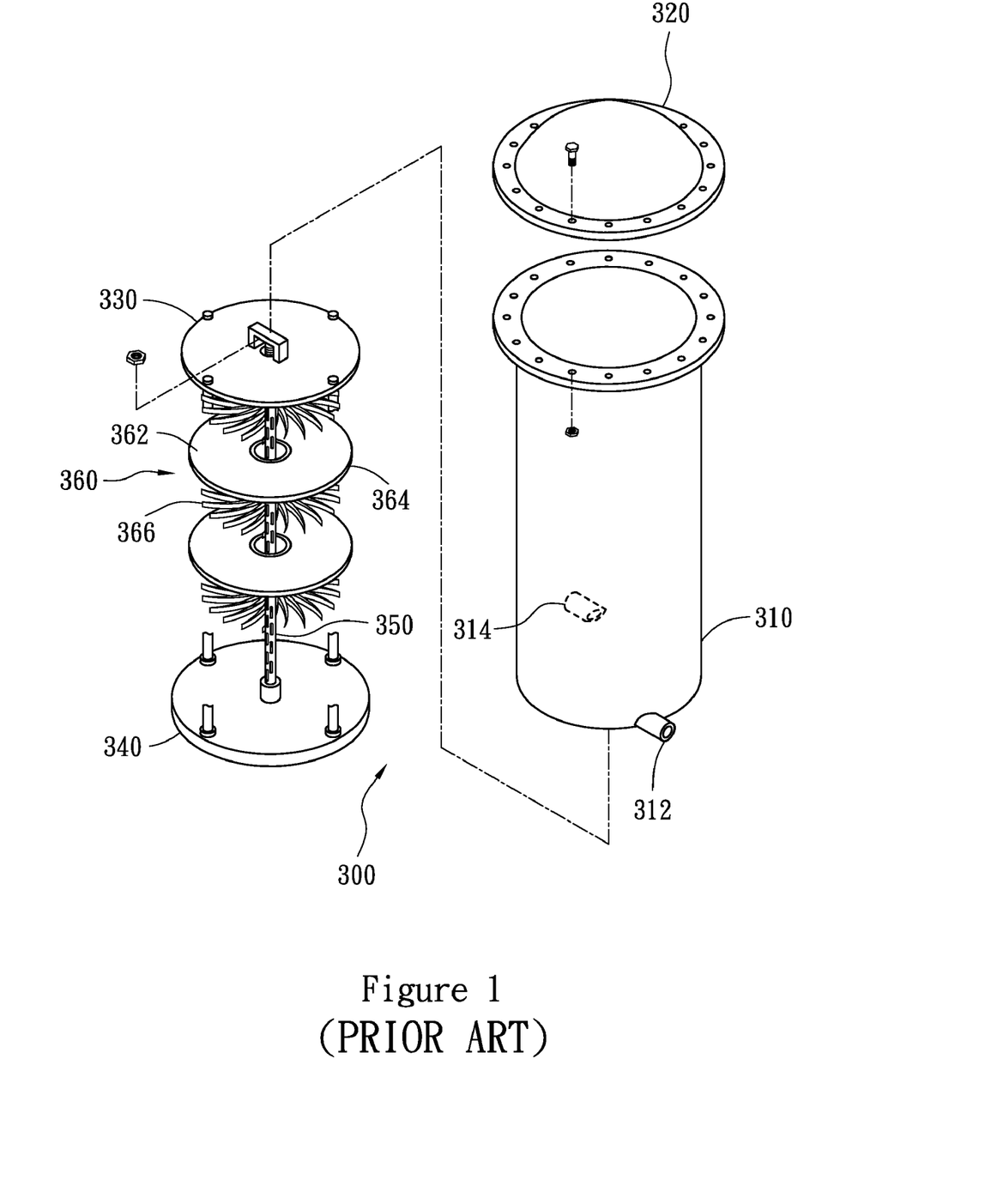
FIG. 1 shows a water-filtering device in accordance with the prior art.

Refer to FIG. 1. The conventional water-filtering device includes a hollow cylinder 310, a covering 320, an upper laminate 330, a bottom laminate 340, a conduit 350 and a plurality of filtering units 360. The hollow cylinder 300 has a space that contains the upper laminate 330 and the bottom laminate 340. The conduit 350 is connected from the center of the upper laminate 330 to the center of the bottom laminate 340. The filtering units 360 surround the conduit 350 in the form of stacked layers. The hollow cylinder 310 has a water inlet 312 and a water outlet 314 defined beneath and connected with the space. Furthermore, each filtering unit 360 includes a filtering membrane 362, a water-conducting disc 364 and an actinoid vane 366. The filtering membrane 362 is in the form of a flat bag. The water-conducting disc 364 is used to fix and position the filtering membranes 362. The actinoid vane 366 is fixed between the adjacent filtering membranes 362.

During the water-filtering process, the water is pumped into the hollow cylinder 310 through the water inlet 312 and passes through the filtering units 360 from the bottom to the top. The water flows into the filtering membranes 362 through tiny holes of the filtering membranes 362 because of the water pressure, and then flows into the conduit 350. The water then flows through the conduit 350 and is directed to the water outlet of the hollow cylinder 310 to output the filtered liquid.

When the filtering speed is gradually slowed down, the spout-brush method prevents concentration polarization and membrane fouling. The spout-brush method injects water into the conduit and spouts high-pressure water to clean the filtering membrane surface of the filtering units 360 directly. The actinoid vane 366 is also forced to rotate and scrape the dirt attached on the filtering membrane surface.

Although the previous water-filtering device can achieve the desirable objects, the filtering membranes are made of soft material such that the fluid channel between the corresponding filtering membranes is lessened. In this way, the water generation speed is slowed down. Additionally, each vane 366 is stacked between the adjacent filtering membranes 362 and depends on the high-pressure water to rotate and to scrape the dirt attached on the filtering membrane surface. If the dirt or the mud is so numerous that the vane is not capable of rotating normally, the cleaning efficiency of the water treatment is reduced.

Because the vane is exposed in the raw water, the imperceptible mud is easily attached to the surface of the actinoid vane 366 so that the actinoid vane 366 is difficult to clean. Hence, the actinoid vane 366 must be replaced after a constant period.

Consequently, the conventional water-filtering device has the following drawbacks:

1. Because the filtering membranes are made of soft material, the fluid channel between the corresponding filtering membranes decreases when the filtering membranes are pressed by the water. Therefore, the water generation cannot be enhanced.

2. The attached mud between the actinoid vane and the water-conducting disc affects the rotating efficiency of the actinoid vane. Thus, the turbulent flow effect and the cleaning efficiency are decreased.

3. The imperceptible mud is easily attached to the surface of the vane, resulting is that the vane is difficult to clean. Thus, the vane must be replaced frequently. Hence, the cost is raised and the using period is reduced.

4. Not only the vane but also the filtering membrane must be replaced. The actinoid vane and the filtering membrane are replaced individually because they are separate components. Thus, replacing both the actinoid vane and the filtering membrane is time-consuming, inconvenient and high expense.

SUMMARY

It is therefore an objective of the present invention to provide a rotatable water treatment device to solve low water generation efficiency problem caused by the soft filtering membranes. The soft filtering membranes lack sufficient hardness such that the fluid channel between the corresponding filtering membranes decreases when the filtering membranes are pressed by the water.

It is another objective of the present invention to provide a rotatable water treatment device to solve the vane rotating efficiency problem caused by the adhered mud.

It is another objective of the present invention to provide a rotatable water treatment device to solve the redundant step and period problem for replacing the filtering membrane and the vane simultaneously.

A rotatable water treatment device is provided and includes a hollow shaft and multiple filtering units. The hollow shaft has an axis hole, an external wall and a plurality of through holes defined through the external wall to communicate with axis hole. The filtering units are watertightly mounted on the external wall of the hollow shaft. Each of the filtering units has center hole, two clipping nets, a supporting net and two filtering membranes. The center hole holds the hollow shaft and communicates with the through holes. The supporting net is mounted between the clipping nets. The filtering membranes sandwiches the clipping nets. Besides, the supporting net, the clipping nets and the filtering membranes are arranged in a stacked manner.

The supporting net and the clipping nets are sandwiched between the filtering membranes such that the surface tension of the filtering membrane is enhanced. Thus, the filtered liquid is conducted to the hollow shaft rapidly. As a result, the filtering membrane can be prevented from sinking into the meshes of the supporting net with the pump effect.

The supporting net and the clipping nets between the filtering membranes solidify the filtering unit to resist the swing effect cause by the inertia rotation to boost the utilization.

The multiple hollow shafts of this rotatable water treatment device are parallel to each other. Multiple external peripheries of the filtering units of the adjacent hollow shafts interlace with each other. Hence, a fierce turbulent flow effect is provided to stir the raw water in the raw water treatment tank when the hollow shafts are rotated. In this way, the attached mud on the filtering membrane of the filtering unit is reduced, so the conventional drawback of the adhered mud on the vane can be improved.

As the previous description, there are some effects of the rotatable water treatment device of the present invention:

1. The supporting net and the clipping nets between the filtering membranes fix the filtering membrane to prevent decreasing fluid channel. Thus, the filtered liquid is conducted to the hollow shafts rapidly to accelerate the filtering.

2. The clipping nets can prevent the filtering membranes from sinking into the meshes of the supporting net.

3. The supporting net and the clipping nets between the filtering membranes can solidify the filtering unit to resist the swing effect cause by the inertia rotation to boost the utilization. Furthermore, a shear stress acts on the attached mud or dirt on the filtering membrane surface to restrain the growth of the attached mud on the filtering membrane surface.

4. The fierce turbulent flow effect caused by the interlaced filtering units can stir the raw water in the raw water treatment tank when the hollow shafts are rotated. Thus, the attached mud on the filtering membrane of the filtering unit is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 2:
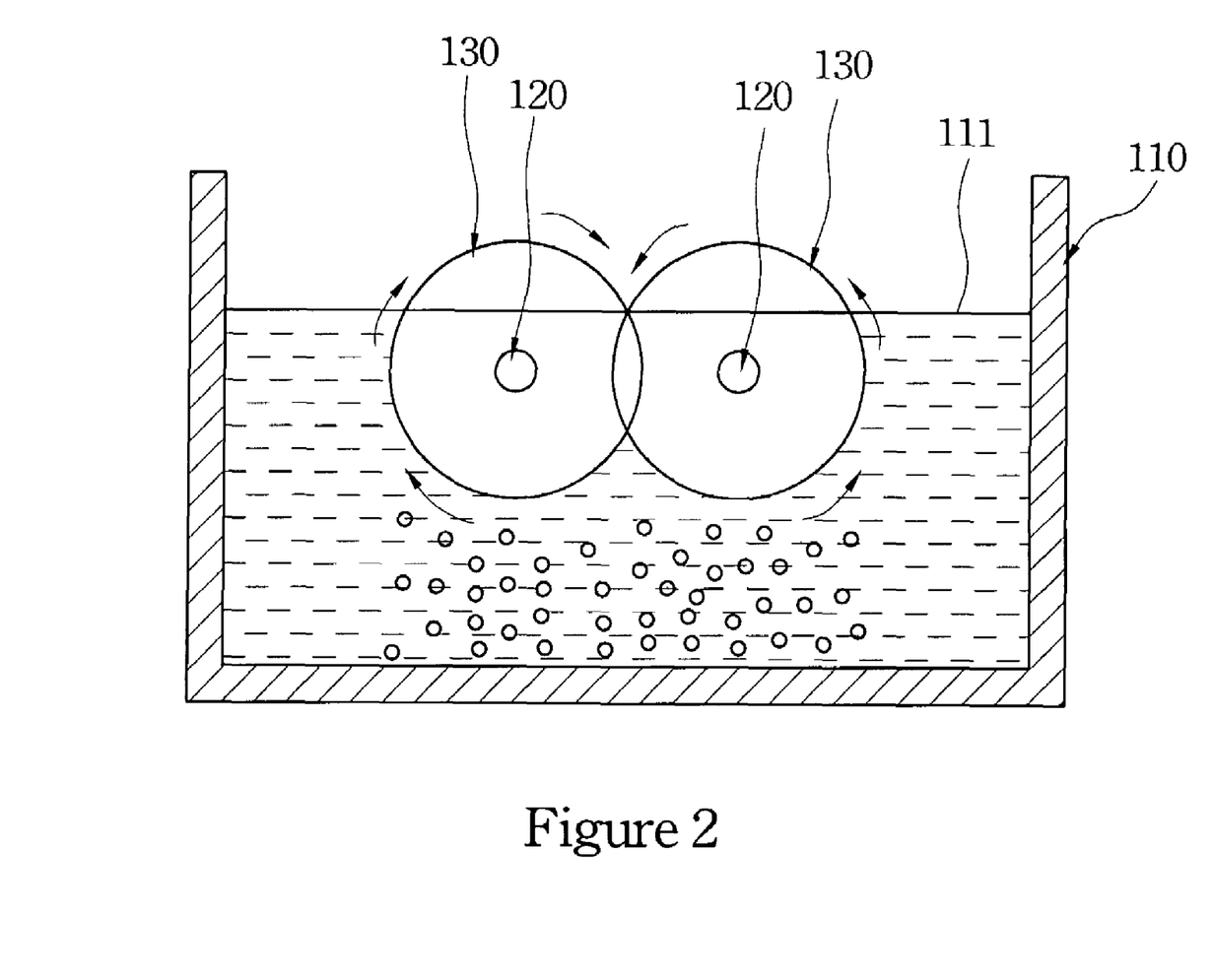
FIG. 2 shows a partial sectional view of the rotatable water treatment device of the embodiment of the present invention.
Figure 3:
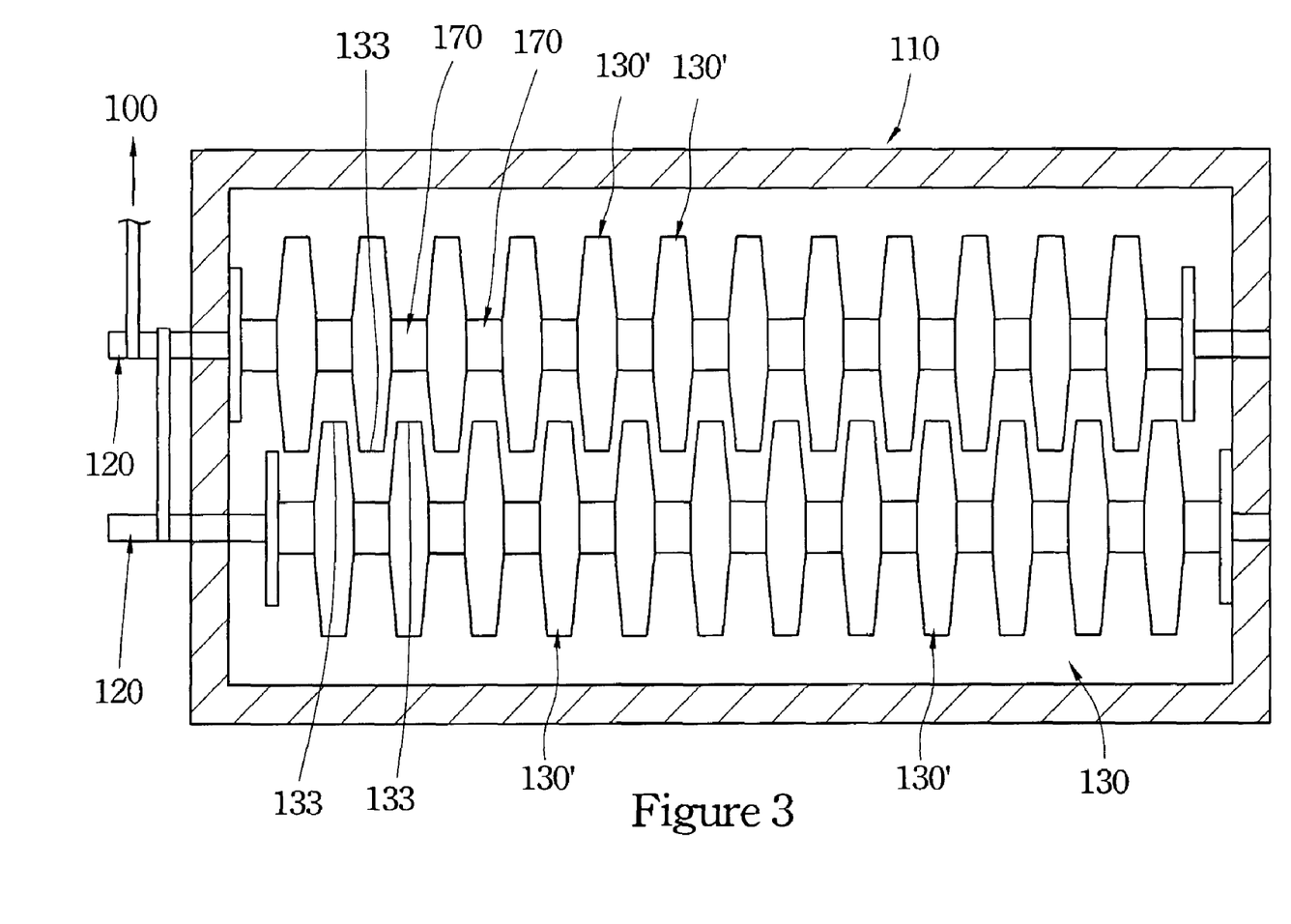
FIG. 3 shows a top view of the embodiment of the present invention.

Refer to FIG. 2 and FIG. 3. FIG. 2 is a partial sectional view illustrating the rotatable water treatment device of the embodiment of the present invention. FIG. 3 is a top view illustrating the rotatable water treatment device of the embodiment in accordance with FIG. 2.

The rotatable water treatment device is connected with a power unit 100 and includes a raw water treatment tank 110, at least one hollow shaft 120 and multiple filtering units 130. The hollow shafts 120 are arranged in parallel and in the raw water treatment tank 110. In this embodiment, two hollow shafts 120 are illustrated.

Figure 4:
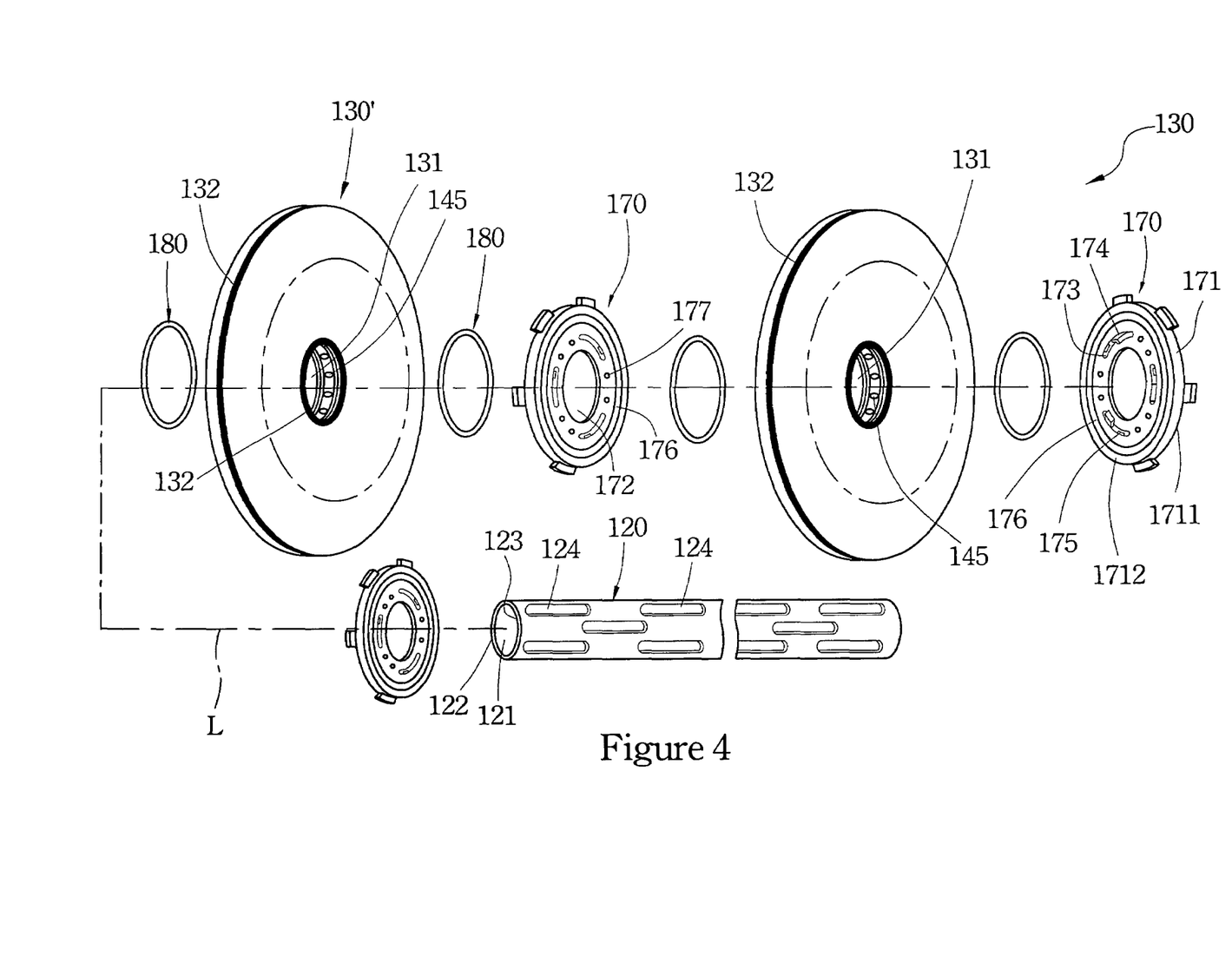
FIG. 4 shows an exploded perspective view of two filtering units, two water conducting discs, a hollow shaft and multiple sealing rings.

Refer to FIG. 3 and FIG. 4. FIG. 4 is an exploded perspective view illustrating two filtering units 130', two water-conducting discs 170, a hollow shaft 120 and multiple sealing rings 180.

The power unit 100 rotates each of the hollow shafts 120 around its axis L. Each hollow shaft 120 includes an axis hole 121, an external wall 122, an internal wall 123 and a plurality of through holes 124. The axis hole 121 is defined along its axis L. The external wall 122 and the internal wall 123 are defined opposite to each other. The through holes 124 are extended from the external wall 122 to the internal wall 123 to lead the liquid to the axis hole 121.

Figure 5:
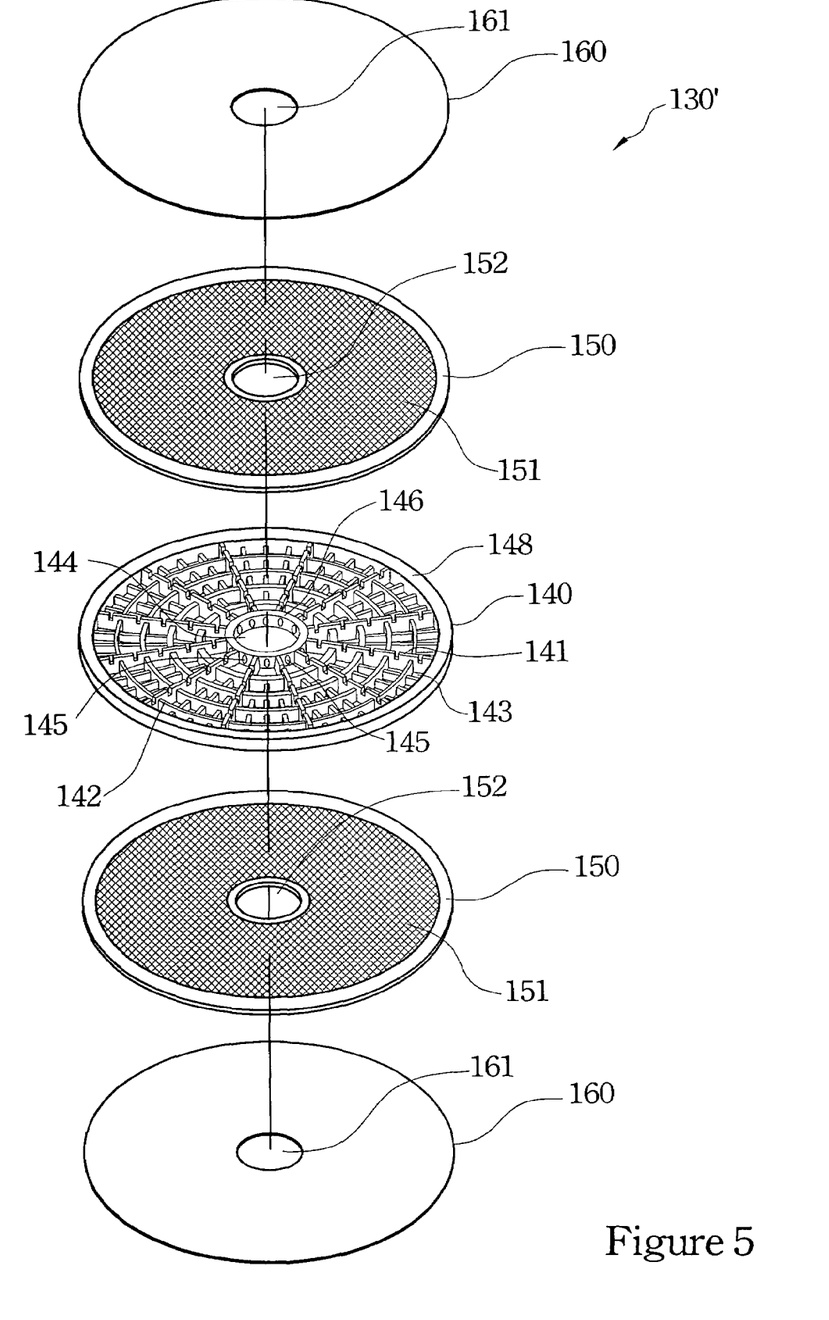
FIG. 5 shows an exploded perspective view of the filtering unit in FIG. 4.

Refer to FIG. 4 and FIG. 5. FIG. 5 is an exploded perspective view illustrating the filtering unit 130'. Each filtering unit 130' encircles the hollow shaft 120. Each filtering unit 130' includes a center hole 131, a supporting net 140, two clipping nets 150, two filtering membranes 160, two water conducting discs 170 and two sealing rings 180. The center hole 131 holds the hollow shaft 120 and communicates to the through holes 124. The clipping nets 150 sandwich the supporting net 140 bilaterally, and the filtering membranes sandwich the clipping nets 150 bilaterally. The two water conducting discs 170 aligns with the center hole 131 and are respectively mounted at two opposite filtering membranes 160. A sealing ring 180 is mounted between the water conducting disc 170 and the filtering membrane 160. The supporting net 140, the clipping nets 150 and the filtering membranes 160 are stacked with each other. The above elements are all in circular form.

Figure 7:
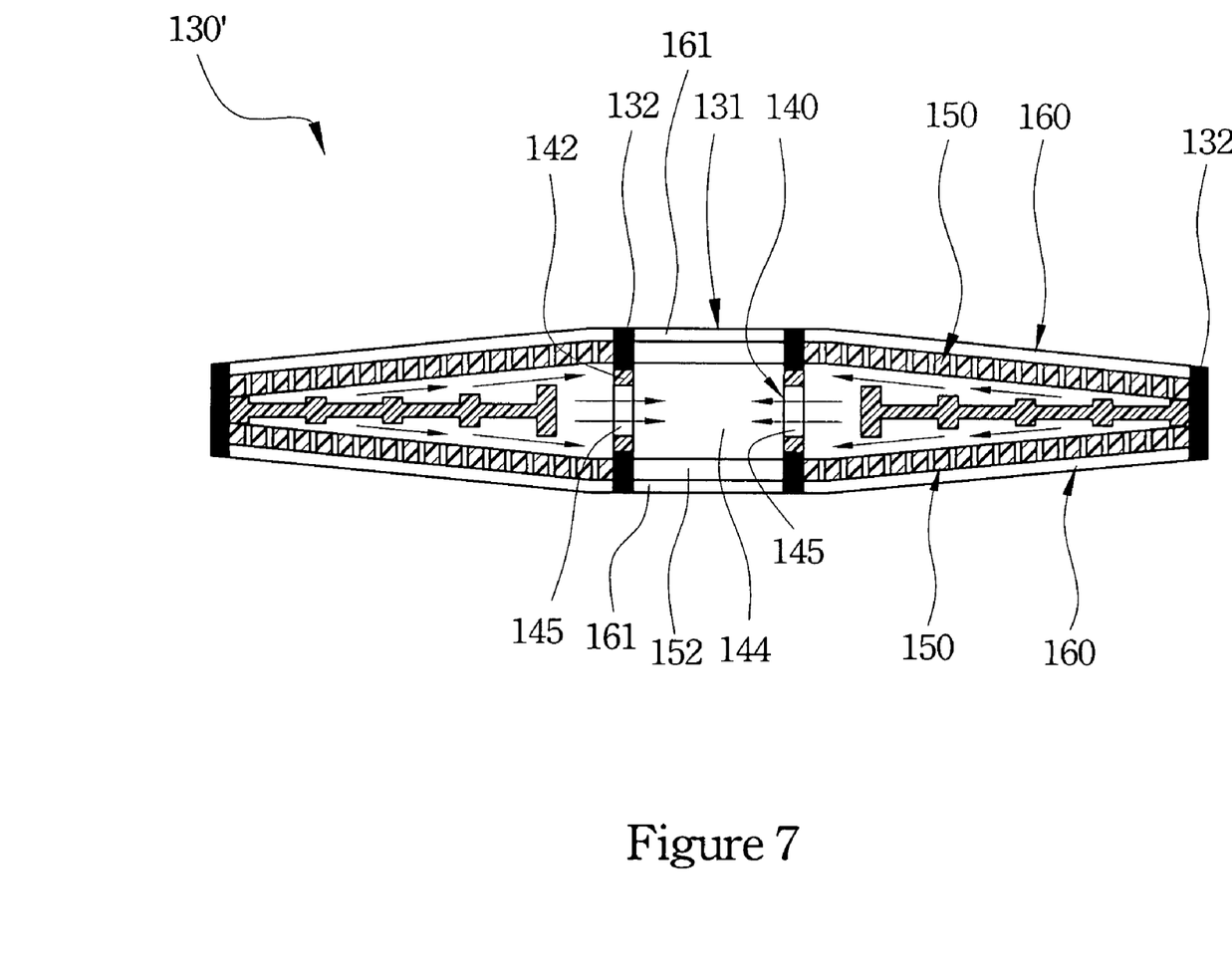
FIG. 7 shows an assembly sectional view of the filtering unit in FIG. 5.

Refer to FIG. 5. The supporting net 140 includes an inner ring 146, an outer ring 148, multiple first ribs 141, multiple second ribs 142, a plurality of meshes 143, an opening 144 and a plurality bores 145. The first ribs 141 are formed in a radial arrangement, and the second ribs 142 are formed in a concentric circle arrangement. The second ribs 142 are intercrossed with the first ribs 141 to form the meshes 143. The inner ring 146 forms an opening 144. The bores 145 are arranged on the inner ring 146. The supporting net 140 is made of plastic. In the sectional view of the supporting net 140, the thickness is gradually lessened from the inner ring to the outer ring. Refer to FIG. 4 and FIG. 7. FIG. 7 is an assembly sectional view illustrating the filter unit 130'. The sectional thickness of the second ribs 142 is less than the sectional thickness of the first ribs 141 such that the liquid flows forward to the inner ring 146. Thus, the liquid is conducted to the center hole 131 of the filtering unit 130' through the bores 145 of the inner ring 146, and then conducted to the axis hole 121 via the through holes 124 of the hollow shaft 120 to complete water-filtering.

Refer to FIG. 5 and FIG. 7. The clipping nets 150 are made of plastic and include numerous frames to form numerous meshes 151. The meshes 151 of the clipping nets are smaller than the meshes 143 of the supporting net 140. The clipping net includes an opening 152 aligning with the opening 144 of the supporting net 140. Furthermore, the clipping net 150 separates the filtering membrane 160 and the supporting net 140 to prevent filtering membrane 160 from sinking to the meshes 143 of the supporting net 140. Thus, the flowing speed during the water-filtering procedure is enhanced.

In this embodiment, the filtering membrane 160 is made of polyvinylidene difluoride (PVDF), so called UF membrane. The filtering membrane 160 is provided for the germ (mud) to attach and grow, and the aperture of the filtering membrane 160 is about 0.01-0.04 μm. The filtering membrane 160 also has an opening 161 defined in the center and aligning with the opening 152 of the clipping net 150.

Refer to FIG. 4 and FIG. 7. The external peripheries of the filtering membranes 160, the clipping nets 150 and the supporting net 140 are stacked into one piece (130') by the high frequency sealing. Thus, a sealing portion 132 occurs in the external periphery and in the internal periphery. The opening 144 of the supporting net 140 is stacked with the opening 152 of the clipping net 150 and the opening 161 of the filtering membrane 160 to form the center hole 131 of the filtering unit 130.

Figure 6:
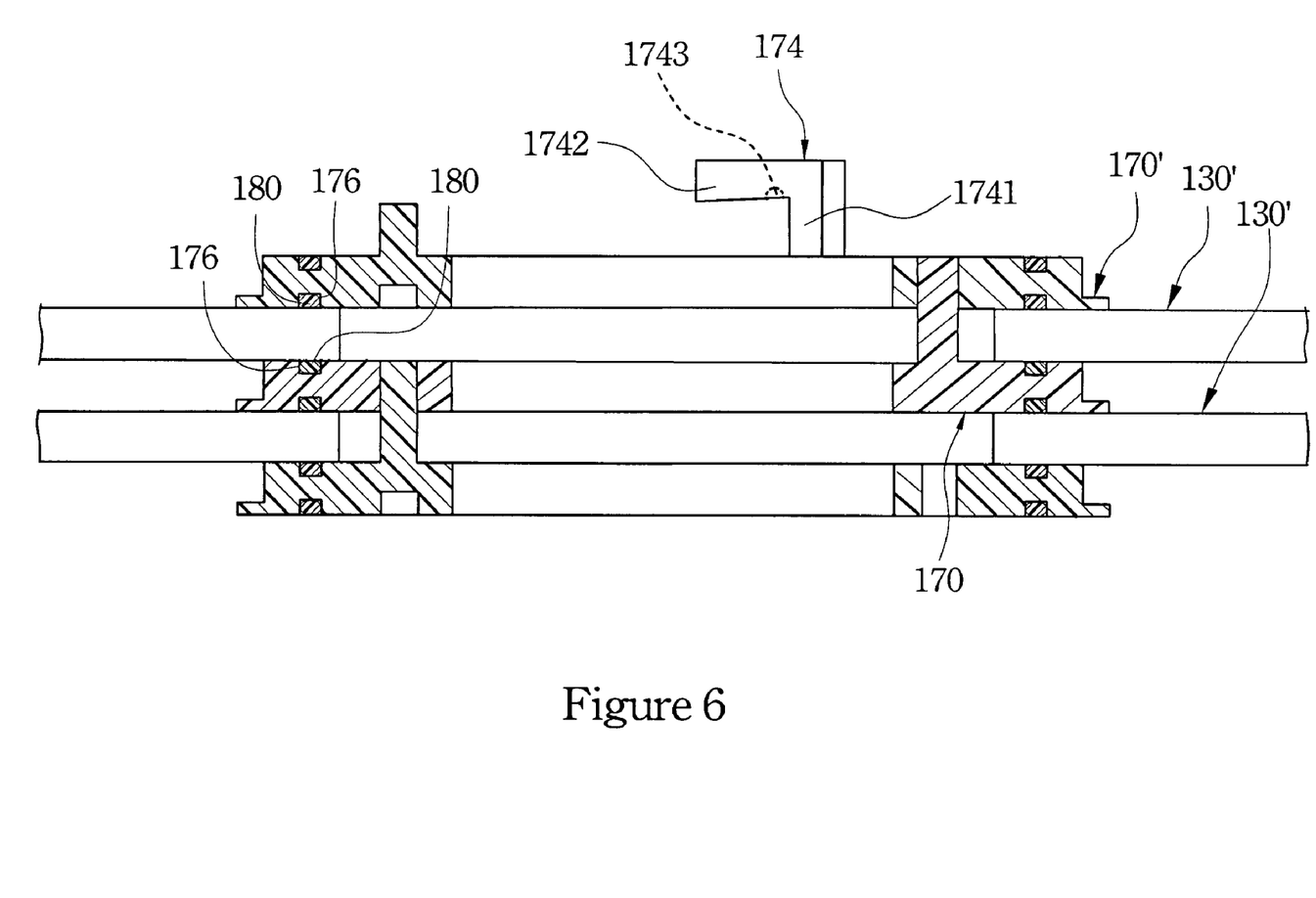
FIG. 6 shows a partial sectional view of the water-conducting disc, the filtering unit and the sealing ring in FIG. 4.

Refer to FIG. 4 and FIG. 6. FIG. 6 is a partial sectional view illustrating the water-conducting disc 170, the filtering substance 130' and the sealing rings 180. Each of the water-conducting discs 170 includes a body 171, an aperture portion 172, a plurality of water conducting holes 173, a locking portion 174, a joint portion 175, two annular grooves 176 and multiple locking holes 177. The aperture portion 172 aligns with the center hole 131. The water conducting holes 173 are arranged around the aperture portion 172. The locking portion 174 is extended from a disc surface 1712 of the body 171 to the outside, and the 1175 defined inside each of the water conducting holes 173. The two annular grooves 176 are respectively defined on the outer periphery of the disc surface 1711 and the disc surface 1712. The locking holes 177 are alternately defined between the water conducting holes 173. Furthermore, the locking portion 174 has a first section 1741 extended perpendicularly from the disc surface 1712 and a second section 1742 extended perpendicularly from the end of the first section 1741. The second section 1742 engages with the joint portion 175 of another adjacent water conducting disc 170' (FIG. 8).

Figure 8:
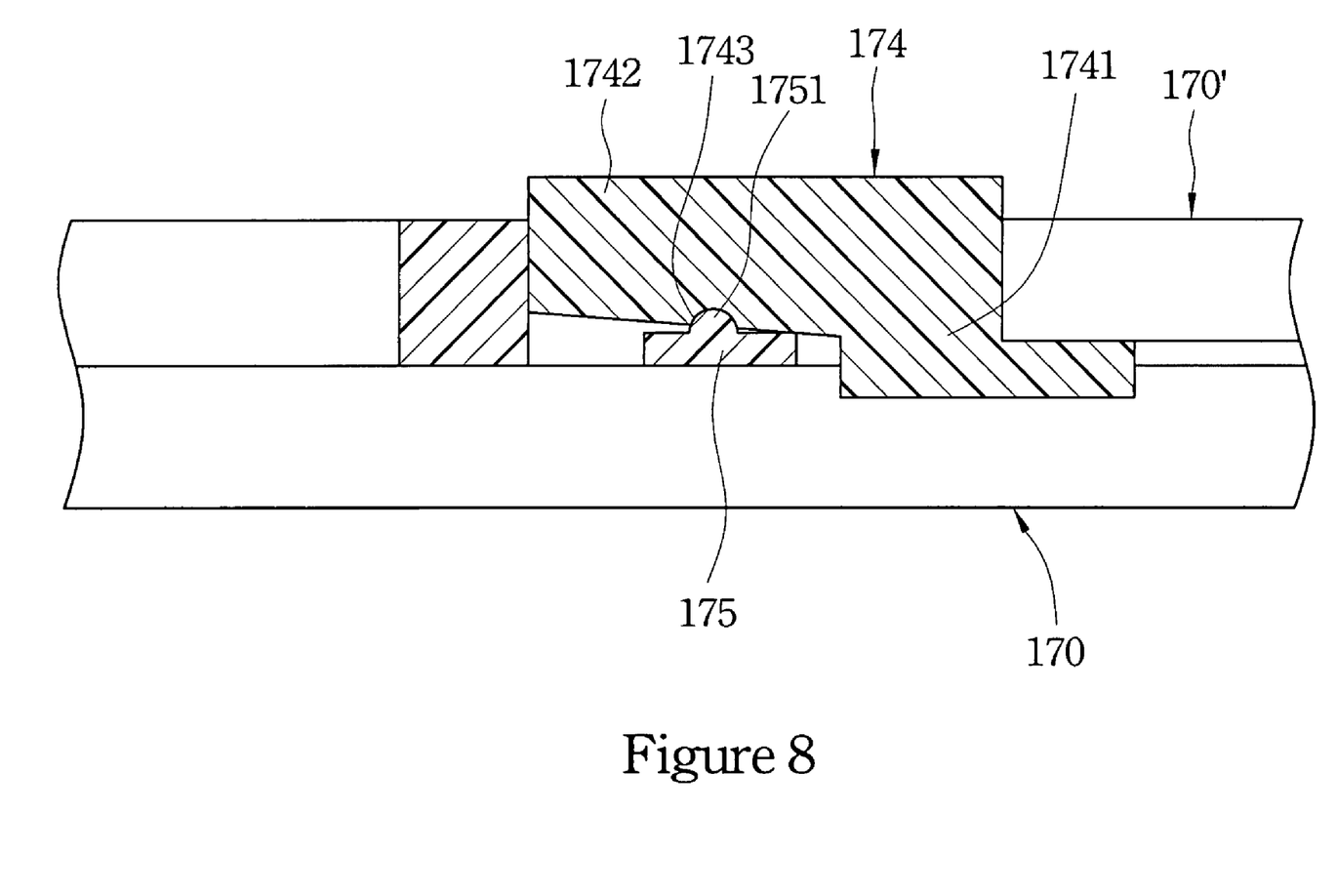
FIG. 8 shows a sectional view of an interlock between a convex surface and a concave surface for the two water-conducting discs.

Refer to FIG. 6 and FIG. 8. FIG. 8 is a sectional view of an interlock between a convex surface 1751 and a concave surface 1743 for the two water-conducting discs 170 and 170'. The locking portion 174 has a concave surface 1743 located under the second section 1742, and the joint portion 175 has a convex surface 1751 located on the top side. After stacking and assembling the water conducting discs 170 and 170', the convex surface 1751 of the joint portion 175 engages with the concave surface 1743 of the locking portion 174 to enhance the position effect. The two sealing rings 180 are also set in the two annular grooves 176 of the water conducting discs 170 and 170' to achieve the water tightness.

Refer to FIG. 3 and FIG. 4. Disposing the water conducting discs 170, the sealing ring 180 and the filtering units 130' with the hollow shaft 120 in order to assemble the filtering device 130. The adjacent water conducting discs 170 are located in the filtering units 130' bilaterally and are locked with each other. Accordingly, the filtering unit 130' between the adjacent water conducting discs 170 is fixed firmly. Repeat the described operating steps so that multiple filtering units 130' can be located in the hollow shaft 120.

Refer to FIG. 2 and FIG. 3. The hollow shafts 120 are disposed in the raw water treatment tank 110, and a plurality of outer peripheries 133 of the filtering units 130' are interlaced with each other. When the power unit 100 is forced to rotate the hollow shafts 120, the rotating filtering units 130' can enhance the turbulent flow effect because of the interlaced outer peripheries 133. Refer to FIG. 3 and FIG. 5. The raw water of the raw water treatment tank 110 are sufficiently stirred because of the turbulent flow effect to reduce the deposited mud on the filtering membrane 160 of the filtering unit 130'. In this way, the drawback of the deposited mud on the vane in accordance with the conventional water filtering device can be solved. The supporting net 140 and the clipping nets are sandwiched between the filtering membranes 160 such that the filtered water is conducted to the hollow shaft 120 to accelerate the filtering. Additionally, the filtering membrane 160 can be prevented from sinking into the meshes 143 of the supporting net 140 caused by the pump effect. Furthermore, the supporting net 140 and the clipping nets 150 can solidify the filtering unit 130' to resist the swing effect caused by the inertia rotation and enhance the utility.

Refer to FIG. 2. The filtering unit 130' is located in the raw water treatment tank 110 by the hollow shafts 120. In this embodiment, the rotatable water treatment device can be equal to a membrane bio-reactor (MBR). When the filtering unit 130' rotates, shear stress acts on the attached mud or dirt on the filtering membrane surface to restrain the growth of the mud attached on the filtering membrane surface. Furthermore, most part of the filtering units 130' of the filtering unit 130' are immersed under a liquid level 111, and fewer parts are exposed on the liquid level 111 and in the air. Therefore, two bio reaction zones are provided, the zone on the liquid level is an aerobic zone and another zone under the liquid level is anaerobic zone. When the rotating filtering unit 130' is in contact with the influent raw water, the microorganisms are attached on the surface of the filtering membrane 160. As the rotation of the filtering unit 130', the microorganisms act with the oxygen in the air to generate an aerobic process when the raw water is taken to the aerobic zone on the liquid level 111. The raw water also proceeds with the organic biodegradation with the microorganisms attached on the filtering membrane surface and also proceeds with the nitrification process to denitrify. The raw water and the air are taken to the anaerobic zone under the liquid level 111 by the filtering units 130' to generate an anti-nitrification anaerobic processing to dephosphorize. Thus, the organic contaminant can be cleaned because of this kind of rotation. In addition, the filtering membrane 160 has a portion under the liquid level 111 and without being in contact with the air to be an absolute anaerobic zone. With this absolute anaerobic zone, the loss of the microorganisms mud caused by the shear stress of the rotation of the filtering unit 130' can be decreased. Besides, organic material with big molecules cannot be biodegraded rapidly and are reserved in the reactor to be decomposed. The location of the filtering membrane 160 immersed in the liquid level 111 can be modified to alter the ratio between the aerobic zone and another zone under the liquid level is the anaerobic zone to improve the concentration polarization.

In this embodiment, the water treatment device is used in the form of the inner type (located in the raw water tank 110), and it can be used in the form of the hang type (located out of the raw water tank 110). Because the structure and the operation between the inner type water treatment device and the hang type water treatment device are identical, there is no more detailed description.

Figure 9:
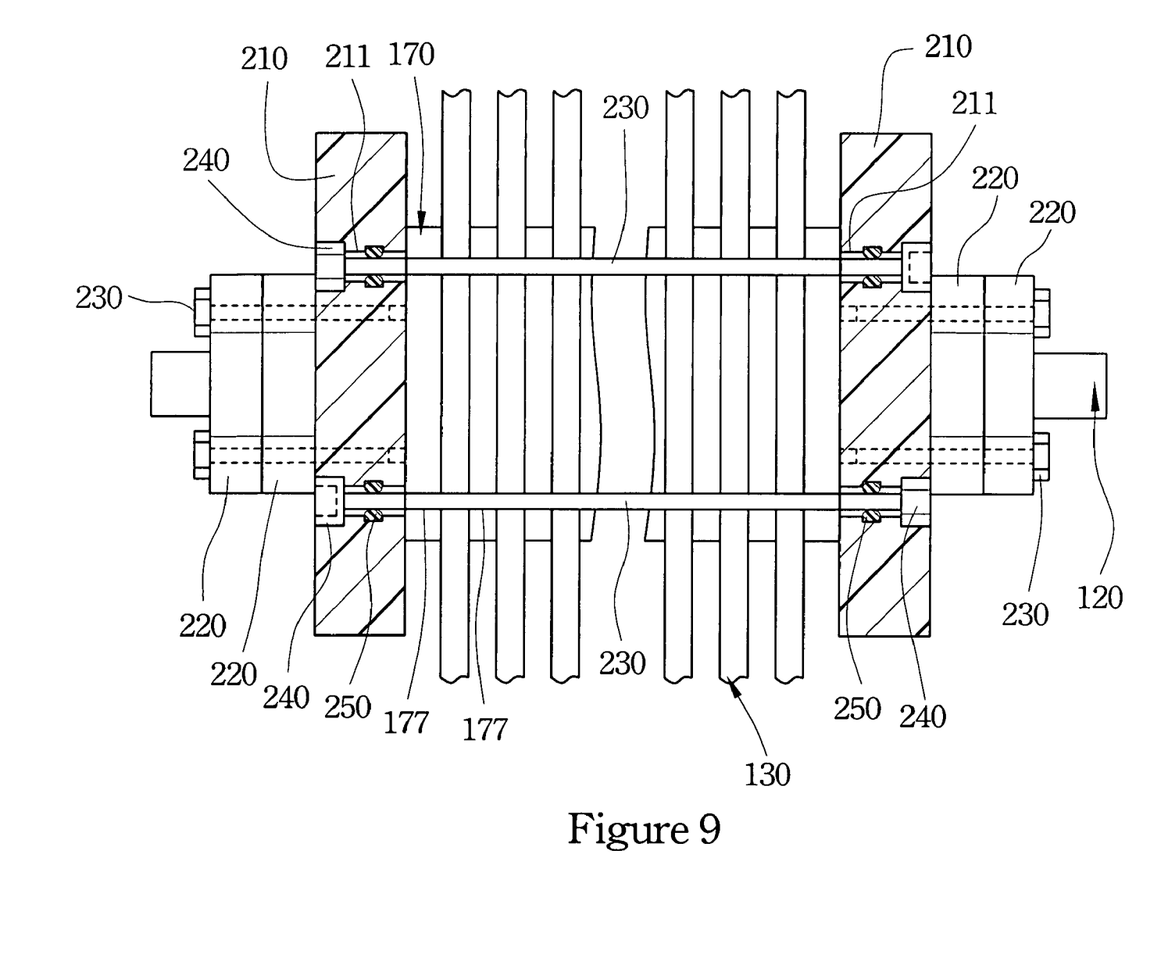
FIG. 9 shows a partial sectional view of the filtering unit and two external locked trays, four outside nuts, two bolts and two nuts locked in the hollow shaft.
Figure 10:
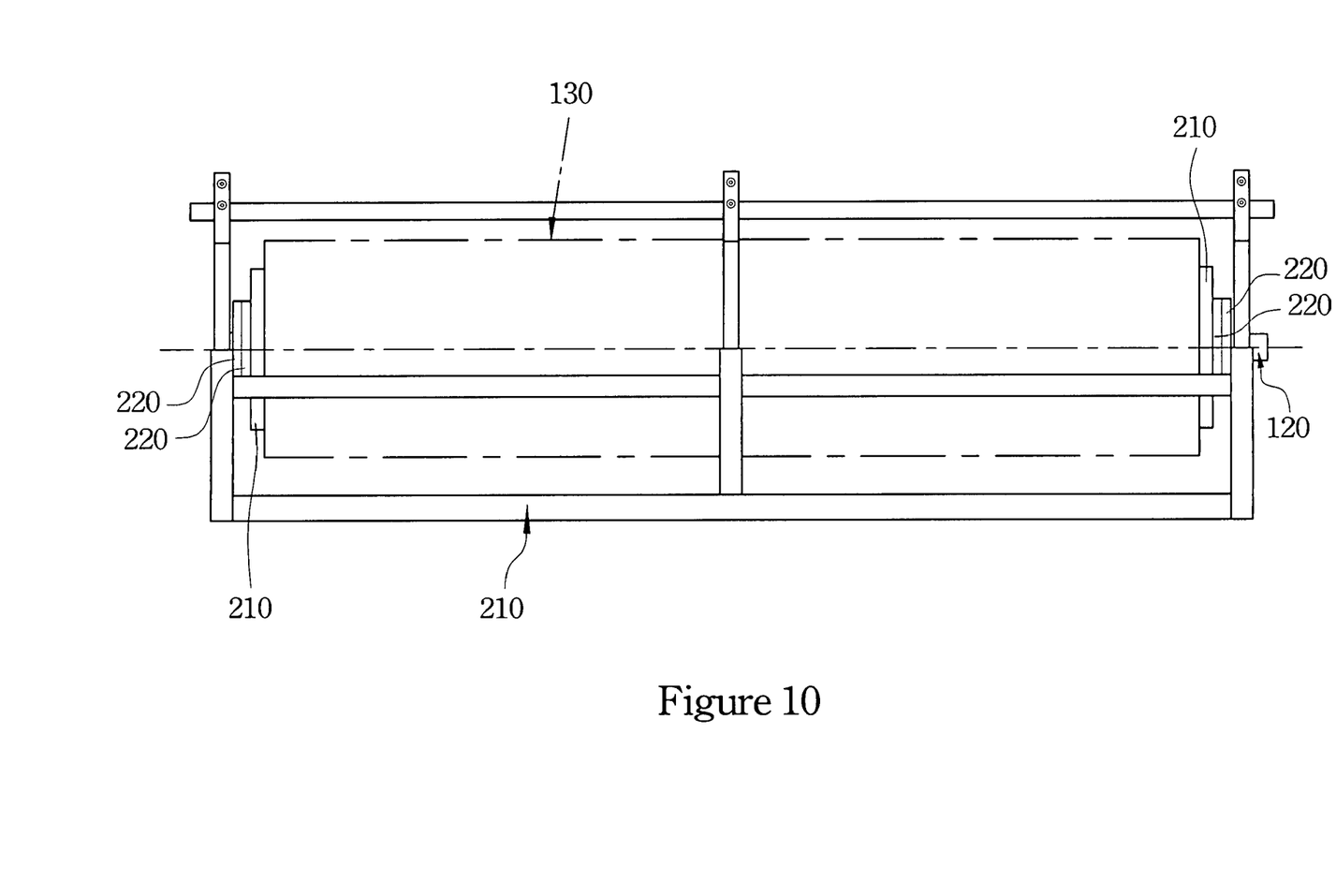
FIG. 10 shows an assembly side view of the filtering unit located on a water jet device.
Figure 11:
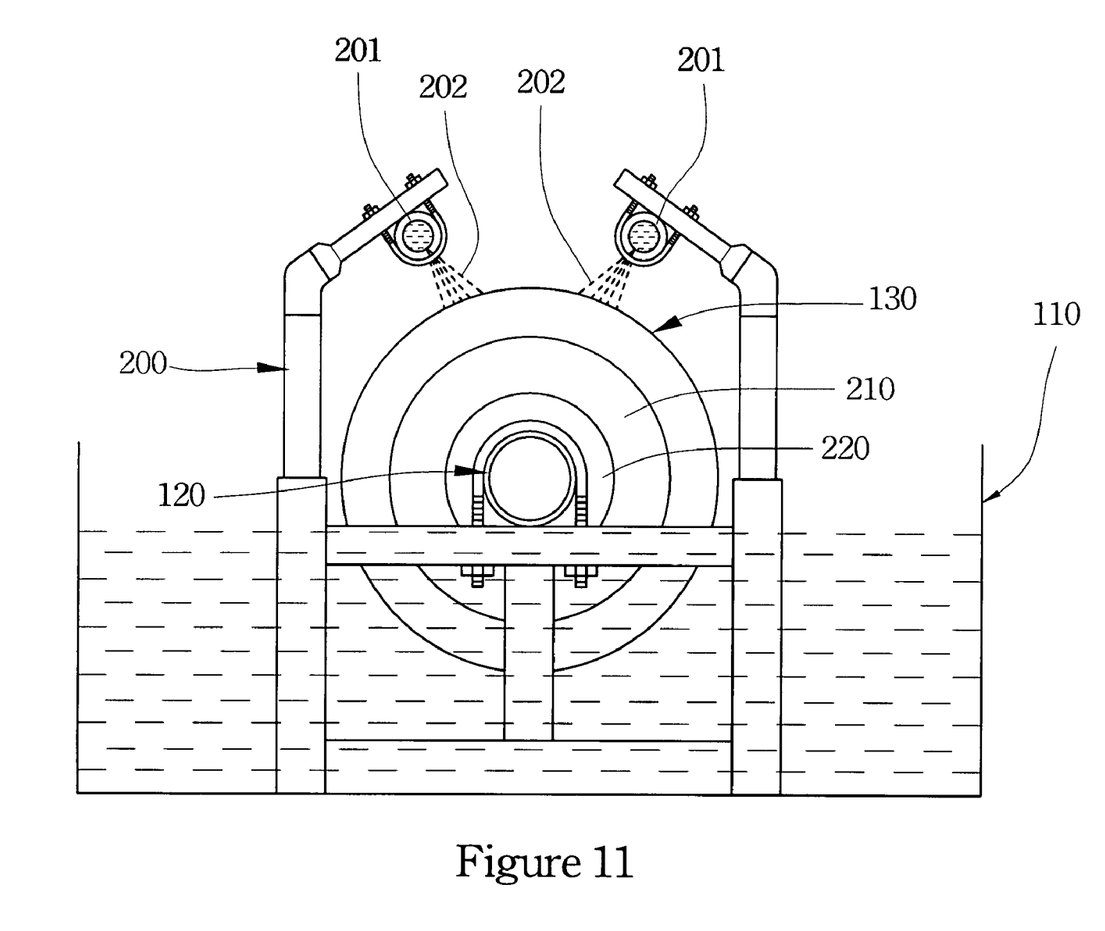
FIG. 11 shows another side view of the filtering unit located on the water jet device.

Refer to FIG. 9, FIG. 10 and FIG. 11. FIG. 9 is a partial sectional view illustrating the filtering device 130 and two external locked trays 240, four external nuts 220, two bolts 230 and two nuts 240 locked in the hollow shaft 120. FIG. 10 is an assembly side view illustrating the filtering device 130 located on a water jet device. FIG. 11 is another side view illustrating the filtering device 130 located on the water jet device.

When the water filtering device must be washed, the washing unit is mounted in the water jet device 200 to clean the water filtering device. The water jet device 200 can be used when it is immersed in the raw water treatment tank 110. Multiple external locked trays 210, multiple external nuts 220, multiple bolts 230 and multiple nuts 240 are also used to lock the hollow shaft 120 wherein dual external locked trays 210 are used to fix the filtering device 130. The locking holes 177 of the water conducting disc 170 and the center hole 131 of the filtering unit 130 receive the bolts 230 (refer to FIG. 4). A plurality of sealing rings 250 are set in the apertures 211 of the external locked trays 210 to prevent water leakage. As a result, the rotating filtering device 130 can be washed by the ejected water 202 from the bilateral water pipes 201. Therefore, the mud attached on the surface of the filtering unit 130' can be removed such that the filtering unit 130' can be reused without replacing or demounting to wash.

According to the composition and the embodiments above, there are many advantages of the rotatable water treatment device of the present invention, such as:

1. The supporting net 140 and the clipping nets 150 are sandwiched between the filtering membranes 160 such that the filtered liquid is conducted to the hollow shaft 120 rapidly. As a result, the filtering membrane 160 can be prevented from sinking into the meshes 143 of the supporting net 140 with the pump effect.

2. Furthermore, the supporting net 140 and the clipping nets 150 between the filtering membranes 160 can solidify the filtering unit 130 to resist the swing effect cause by the inertia rotation. The shear stress caused by the filtering unit 130 and the liquid level 111 during rotation can remove the mud attached on the surface of the filtering membranes 160 such that an automatic cleaning effect is generated to enhance the utilization.

3. The filtering units 130' are set in the raw water treatment tank 110 and are stacked and interlaced with each other. Hence, a fierce turbulent flow effect is provided to stir the raw water in the raw water treatment tank 110 when the hollow shafts 120 are rotated. In this way, the attached mud on the filtering membrane 160 of the filtering unit 130' is reduced, so the conventional drawback of the adhered mud on the architecture can be improved.

4. The water treatment device can be applied with the water jet device 200 to clean the filtering membranes 160 of the filtering units 130' when the hollow shaft 120 rotates. Consequently, the using period is extended.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rotatable water treatment device, comprising:
    a raw water treatment tank;
    at least one hollow shaft rotationally disposed in the raw water treatment tank, and the hollow shaft including:
        an axis hole defined therein; and
        a plurality of through holes defined therein transversely and in communication with the axis hole; and
    multiple filtering units watertightly mounted on the hollow shaft, and each of the filtering units including:
        a center hole for receiving the hollow shaft and communicating with the through holes;
        two filtering membranes;
        two clipping nets sandwiched between the filtering membranes;
        a supporting net mounted between the clipping nets; and
    multiple water-conducting discs mounted on the hollow shaft so that the water-conducting discs are arranged alternately with the filtering units, wherein each of the water-conducting discs is aligned with the center hole of an adjacent one of the filtering units and comprises:
        an aperture portion aligned with the center hole;
        water-conducting holes defined therein, around the aperture portion;
        locking holes alternately defined between the water-conducting holes;
        two annular grooves defined in opposite surfaces thereof; and
        two sealing rings disposed in the annular grooves;
        a locking portions formed on a first side thereof, within each of the water-conducting holes; and
    a joint portion formed on the first side thereof, within each of the water-conducting holes.

2. The rotatable water treatment device of claim 1, wherein the locking portion includes a first section extended perpendicularly from the first surface and a second section extended perpendicularly from the first section, and the second section engages the joint portion of one of adjacent water conducting discs.

3. The rotatable water treatment device of claim 2, wherein the locking portion further includes a concave surface formed in the second section, and the joint portion further includes a convex surface to fit into the concave surface of the locking portion of one of adjacent water conducting discs.

4. The rotatable water treatment device of claim 1, wherein the supporting net has an inner ring, an outer ring, multiple first ribs in a radial arrangement and multiple second ribs in a concentric circle arrangement wherein the first ribs intercross with the second ribs to form a plurality of meshes.

5. The rotatable water treatment device of claim 4, wherein the inner ring includes a plurality of bores communicating with the center hole of the filtering unit.

6. The rotatable water treatment device of claim 4, wherein the supporting net has a sectional area, and the sectional area is gradually curtailed from the inner ring to the outer ring.

7. The rotatable water treatment device of claim 1, wherein the at least one hollow shaft comprises multiple hollow shafts arranged in parallel, each of the filtering units has an outer periphery, and the outer peripheries of the filtering units of the adjacent hollow shafts interlace to each other.

8. The rotatable water treatment device of claim 1, further comprising multiple external locked trays, multiple external nuts, multiple bolts and multiple nuts to lock each of the hollow shafts.

9. The rotatable water treatment device of claim 1, each of the filtering units has a first part immersed in water contained by the raw water treatment tank and a second part exposed in air.

\* \* \* \* \*